(12) United States Patent
Cardoso et al.

(10) Patent No.: US 9,569,680 B2
(45) Date of Patent: Feb. 14, 2017

(54) AUTOMATED RUNNING-ENGINE DETECTION IN STATIONARY MOTOR VEHICLES

(75) Inventors: George Cunha Cardoso, Webster, NY (US); Edgar A. Bernal, Webster, NY (US); Graham Pennington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 847 days.

(21) Appl. No.: 13/364,857

(22) Filed: Feb. 2, 2012

(65) Prior Publication Data

US 2013/0201324 A1 Aug. 8, 2013

(51) Int. Cl.
G06T 7/40 (2006.01)
G06K 9/20 (2006.01)

(52) U.S. Cl.
CPC ............ G06K 9/2036 (2013.01); G06T 7/403 (2013.01); G06T 2207/10016 (2013.01); G06T 2207/10024 (2013.01); G06T 2207/10048 (2013.01); G06T 2207/10141 (2013.01); G06T 2207/20081 (2013.01); G06T 2207/30232 (2013.01)

(58) Field of Classification Search
CPC ...................................................... G01H 9/00
See application file for complete search history.

(56) References Cited

U.S. PATENT DOCUMENTS

| | | | | |
|---|---|---|---|---|
| 3,952,583 A * | 4/1976 | Rosati | ...................... | G01H 9/00 356/341 |
| 5,401,967 A * | 3/1995 | Stedman | ................ | G01N 21/33 250/338.5 |
| 5,704,024 A * | 12/1997 | Voorhies | ............... | G06T 15/506 345/426 |
| 5,809,161 A * | 9/1998 | Auty | ......................... | G01P 3/38 340/937 |
| 6,159,445 A * | 12/2000 | Klaveness | ................ | B82Y 5/00 424/9.1 |
| 6,416,020 B1 * | 7/2002 | Gronskov | ................ | B61K 9/12 246/169 D |
| 6,809,991 B1 * | 10/2004 | Pepper et al. | ................. | 367/149 |
| 6,882,416 B1 * | 4/2005 | Hunter | ............... | G01N 21/8851 356/237.4 |
| 6,988,661 B2 * | 1/2006 | Tsikos et al. | ............ | 235/462.01 |

(Continued)

OTHER PUBLICATIONS

"An HOG-LBP Human Detector with Partial Occlusion Handling," Xiaoyu Wang; IEEE 2009.*

(Continued)

*Primary Examiner* — Richard Torrente
*Assistant Examiner* — Shadan E Haghani
(74) *Attorney, Agent, or Firm* — Kevin Soules; Kermit D. Lopez; Luis M. Ortiz

(57) ABSTRACT

A method for idling vehicle detection comprises shining a light source on an exterior surface of a vehicle with an illumination module, collecting light reflected from the exterior surface of the vehicle with a capture module, and processing the collected light reflected from the exterior surface of the vehicle surface with a processing module wherein the processing model determines if the vehicle's engine is running or if the vehicle's engine is not running.

20 Claims, 6 Drawing Sheets

(56) References Cited

U.S. PATENT DOCUMENTS

| | | | | |
|---|---|---|---|---|
| 7,168,323 | B1* | 1/2007 | Discenzo | G01M 15/12 73/653 |
| 7,469,160 | B2* | 12/2008 | Banks et al. | 600/476 |
| 8,166,421 | B2* | 4/2012 | Magal et al. | 715/863 |
| 8,189,095 | B2* | 5/2012 | Gerwe | 348/370 |
| 8,638,991 | B2* | 1/2014 | Zalevsky et al. | 382/107 |
| 8,687,856 | B2* | 4/2014 | Bower et al. | 382/124 |
| 2004/0055558 | A1 | 3/2004 | McElroy | |
| 2006/0244634 | A1* | 11/2006 | Nath | G06Q 30/0284 340/932.2 |
| 2008/0278303 | A1 | 11/2008 | Winslow | |
| 2010/0242906 | A1 | 9/2010 | Konezny | |
| 2011/0099126 | A1* | 4/2011 | Belani et al. | 705/418 |
| 2011/0116682 | A1* | 5/2011 | Wang | G06K 9/00771 382/103 |
| 2012/0086944 | A1* | 4/2012 | Chrien | B64G 1/66 356/450 |
| 2012/0182392 | A1* | 7/2012 | Kearns et al. | 348/46 |
| 2013/0004017 | A1* | 1/2013 | Medasani et al. | 382/103 |

OTHER PUBLICATIONS

Tutorial Image and Video Description with Local Binary Pattern Variants; Prof. Matti Pietikainen and Prof. Janne Heikkila; Jun. 2011, available at https://www.google.com/url?sa=t&rct=j&q=&esrc=s&source=web&cd=1&cad=rja&uact=8&ved=0ahUKEwiV6qak4fzKAhUM6WMKHXw-CW8QFggiMAA&url=http%3A%2F%2Fwww.ee.oulu.fi%2Fresearch%2Fimag%2Fmvg%2Ffiles%2Fpdf%2FCVPR-tu.*

Materka & Strzelecki, "Texture Analysis Methods—A Review," Technical University of Lodz, Institute of Electronics, COT B11 report, Brussels (1998).*

Test and Measurement Editor, "The trigger function of an oscilloscope," Test & Measurement Tips (2011).*

Intensity Histogram, available at http://homepages.inf.ed.ac.uk/rbf/HIPR2/histgram.htm.*

Tektronix, "Triggering Fundamentals."*

Suruliandi & Ramar, "Local Texture Patterns—A Univariate Texture Model for Classification of Images," IEEE (2008).*

\* cited by examiner

AUTOMATED RUNNING-ENGINE DETECTION IN STATIONARY MOTOR VEHICLES

TECHNICAL FIELD

Embodiments are generally related to the field of vehicle surveillance. Embodiments are also related to methods and systems for the detection of motor vehicle status using digital imagery.

BACKGROUND OF THE INVENTION

Vehicles that are left running while unoccupied or not in use can pose a variety of risks. For example, vehicles left idling at fueling stations can lead to explosions. Likewise, vehicles left idling in closed spaces such as parking structures, garages, or parking lots, pose both pollution and health risks due to accumulation of exhaust gas. With increasing concerns about pollution associated with combustion engines, it is increasingly important to curtail unnecessary idling of vehicles.

In consideration of these concerns, more than 25 states have passed legislation that prohibits idling trucks for longer than a specific period of time. In some counties it is illegal to allow a vehicle to run when stationary for various other reasons.

Traditional video surveillance systems are not well equipped to detect vehicle vibrations because the amplitude of vibration of an idling vehicle is too small to be detected. Typical surveillance cameras have sensor resolutions in the range of a few Megapixels and a field of view on the order to several square meters. Vehicle vibration amplitudes resulting from a running engine therefore translate to sub-pixel motion events. Therefore a need exists for an improved method and system for automatic detection of running engines in stationary motor vehicles.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for a method and system for detecting a stationary idling motor vehicle.

It is another aspect of the disclosed embodiments to provide for an enhanced method and system for automatically scanning an environment to identify stationary idling vehicles.

The aforementioned aspects and other objectives and advantages can now be achieved as described herein. A method for idling vehicle detection, the method comprising: shining a light source on an exterior surface of a vehicle with an illumination module; collecting light reflected from the exterior surface of the vehicle with a capture module; and processing the collected light reflected from the exterior surface of the vehicle surface with a processing module wherein the processing model determines if the vehicle's engine is running or if the vehicle's engine is not running.

The method can include at least one of a camera and a video camera with a circle of confusion greater than 1 pixel, thereby allowing light reflected from the exterior surface of the vehicle to form an interference pattern on the sensor of at least one of the camera and the video camera.

Processing the collected light reflected from the exterior surface of the vehicle further comprises analyzing the texture appearance of the interference pattern by at least one of: a local binary pattern analysis, a scale-invariant feature transformation, a process of Gabor filtering, and a texton-based approach. Other texture descriptors or texture analysis procedures can be used to determine texture appearance metrics.

The method can further include configuring the processing module for identifying a speckle associated with the interference pattern. A relative texture label is then assigned to the group of pixels associated with the identified speckle and a texture appearance metric from the identified speckle is compared to at least one texture appearance metric from a speckle associated with a running engine and at least one texture appearance metric from a speckle associated with a non-running engine to determine if the texture appearance metric resulted from a vehicle with an engine running or from a vehicle with an engine not running. This comparison can be made using at least one of a nearest neighbor classifier, a support vector machine classifier, a Bayes classifier, and a neural network classifier. Other clustering, classification, and machine learning techniques can potentially be used to make the comparison.

The light source described above comprises a coherent, low-power light source, which can be a visible light source, a near infrared light source, and an infrared light source. The method can further comprise monitoring a plurality of vehicles distributed in an environment to determine if any of the vehicles are idling.

In another embodiment, the system for detecting idling vehicles comprises an illumination module configured to shine a light source on an exterior surface of a vehicle, a capture module configured to collect light reflected from the exterior surface of the vehicle, the light being propagated by the illumination module, and a processing module for processing the collected light reflected from the exterior surface of the vehicle, wherein the processing model determines if the vehicle's engine is running or if the vehicle's engine is not running.

The capture module comprises at least one of a camera and a video camera with a circle of confusion greater than 1 pixel, thereby allowing light reflected from the exterior surface of the vehicle to form an interference pattern on the sensor of at least one camera and/or video camera.

The system includes a processing module, which processes the collected light reflected from the exterior surface of the vehicle by analyzing the texture appearance of the interference pattern. This analysis can be performed using one of a local binary pattern analysis, a scale-invariant feature transformation, a process of Gabor filtering, and a texton-based approach. Other texture descriptors or texture analysis procedures can be used to determine texture appearance metrics.

In another embodiment, the system includes a processing module configured for identifying a speckle associated with the interference pattern, assigning a relative texture label to the group of pixels associated with the identified speckle, and comparing a texture appearance metric comprising the relative texture labels from the identified speckle to at least one texture appearance metric from a speckle associated with a running engine and at least one texture appearance metric from a speckle associated with a non-running engine to determine if the texture appearance metric resulted from a vehicle with an engine running or from a vehicle with an engine not running. The processing module compares the texture histograms according to one of a nearest neighbor classifier, a support vector machine classifier, a Bayes classifier, and a neural network classifier. Other clustering, classification, and machine learning techniques can potentially be used to make the comparison.

The system includes a coherent low-power light source. This light source is at least one of a visible light source, a near infrared light source, and an infrared light source. The system is deployed in an environment to monitor a plurality of vehicles and determine if any of the vehicles are idling.

In another embodiment, a method for idling vehicle detection comprises shining a light source on an exterior surface of a vehicle, wherein the light source comprises a coherent, low-power light source. The light is collected from the exterior surface of the vehicle with a capture module, wherein the capture module imaging system has a circle of confusion greater than 1 pixel thereby allowing light reflected from the exterior surface of the vehicle to form an interference pattern on a sensor of the capture module. The collected light is then processed with a processing module wherein processing the collected light reflected from the exterior surface of the vehicle further comprises analyzing the texture appearance of the interference pattern to determine if the vehicle's engine is running or if the vehicle's engine is not running. The coherent low-power light source is at least one of a visible light source, a near infrared light source, and an infrared light source.

The texture appearance of the interference pattern is determined by one of a local binary pattern analysis, a scale-invariant feature transformation, a process of Gabor filtering, and a texton-based approach. Other texture descriptors or texture analysis procedures can be used to determine texture appearance metrics.

The method further comprises monitoring a plurality of vehicles distributed in an environment to determine if any of the plurality of vehicles is idling.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
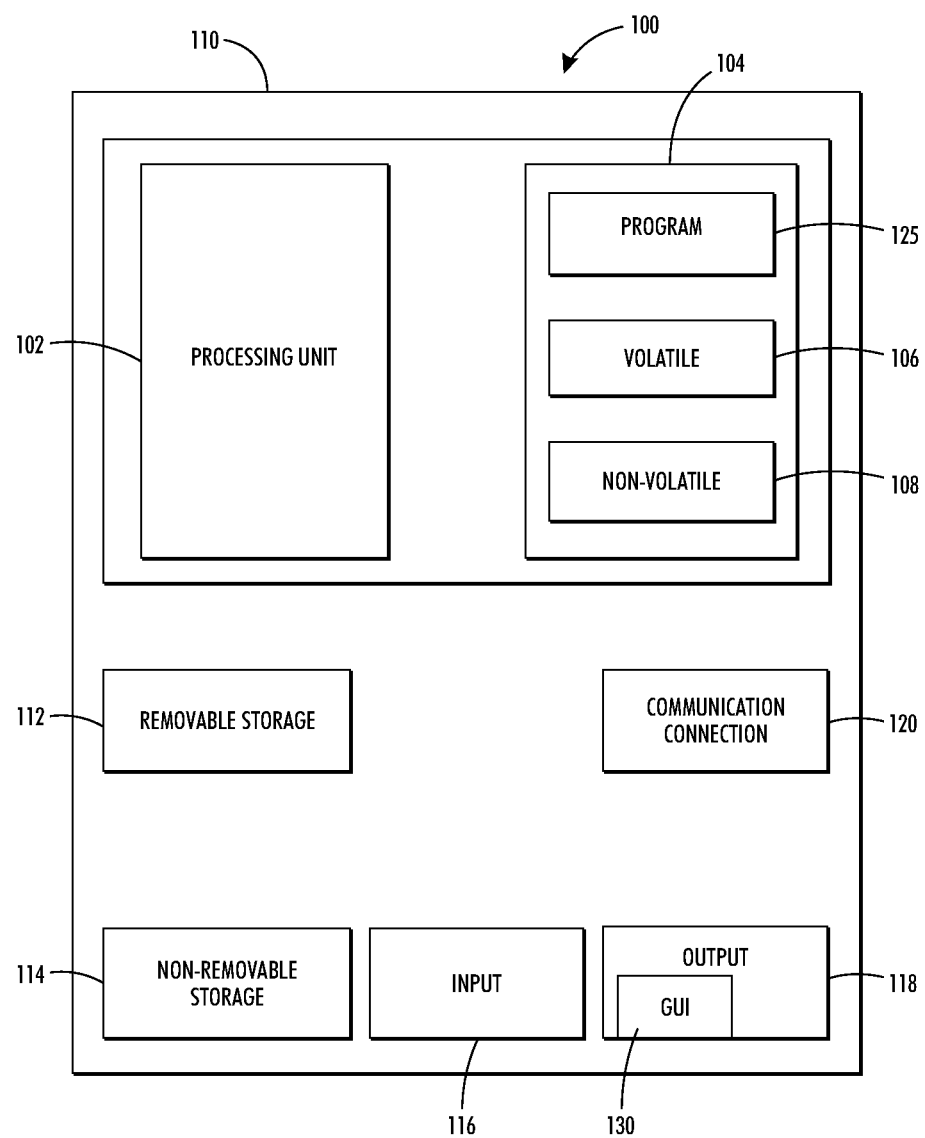
FIG. 1 depicts a block diagram of a computer system which is implemented in accordance with the disclosed embodiments.

The accompanying figures, in which like reference numerals refer to identical or functionally-similar elements throughout the separate views and which are incorporated in and form a part of the specification, further illustrate the disclosed embodiments and serve to explain the principles of the disclosed embodiments. The particular values and configurations discussed in these non-limiting examples can be varied and are cited merely to illustrate at least one embodiment and are not intended to limit the scope thereof.

A block diagram of a computer system 100 that executes programming necessary for executing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data, including video frames.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more detail in FIG. 2.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, allows a user to select and instruct computer system 100. A user interface can be provided using output 118 and input 116.

Output 118 may function as a display for displaying data and information for a user and for interactively displaying a graphical user interface (GUI) 130. Note that the term "GUI" generally refers to a type of environment that represents programs, files, options and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard Computer-readable instructions, for example, program module 125, are stored on a non-transitory, computer-readable medium and are executable by the processing unit 102 of computer 110. Program module 125 may include a computer application. A hard drive, CD-ROM, RAM, Flash Memory, and a USB drive are just some examples of articles including a computer-readable medium.

A module as further described herein may refer to non-transitory instructions media residing in a computer. Additionally, a module may refer to hardware implementations of various elements of the systems and methods disclosed herein.

Figure 2:
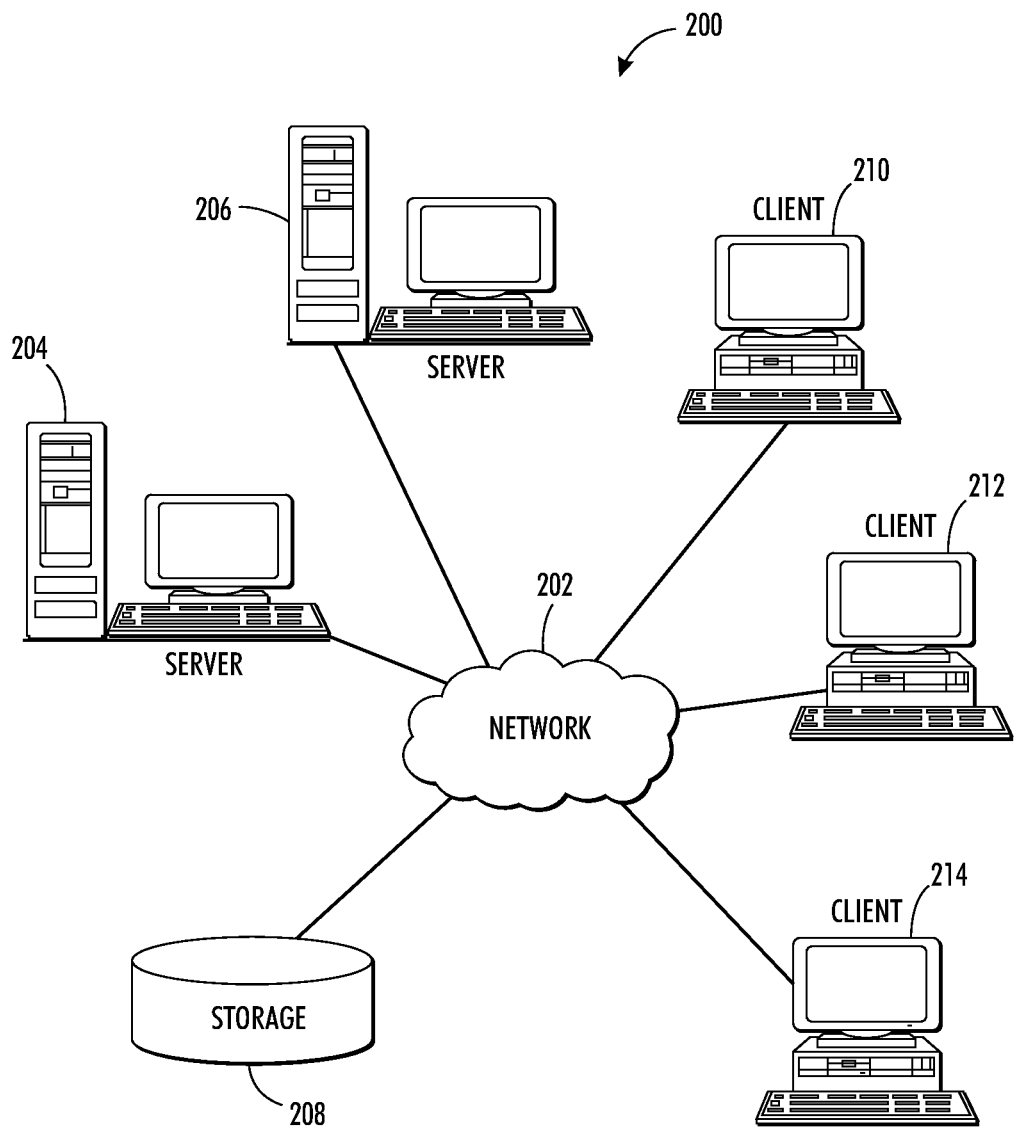
FIG. 2 depicts a graphical representation of a network of data-processing devices in which aspects of the present invention may be implemented.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 204 and 206 and a memory storage unit such as, for example, memory or database 208.

In the depicted example, server 204 and server 206 connect to network 202 along with storage unit 208. In addition, clients 210, 212, and 214 connect to network 202. These clients 210, 212, and 214 may be, for example, personal computers, network computers, or other modules associated with the disclosed invention. Computer system 100 depicted in FIG. 1 can be, for example, a client such as client 210, 212, and/or 214. Alternatively clients 210, 212, and 214 may be, for example, a photographic or still camera, video camera, tracking device, etc.

Computer system 100 can also be implemented as a server such as servers 204 and/or 206, depending upon design considerations. In the depicted example, server 204 provides data such as boot files, operating system images, applications, and application updates to clients 210, 212, and 214. Clients 210, 212, and 214 are clients to server 204 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 also may be implemented as a number of different types of networks such as, for example, an intranet, a local area network (LAN), or a wide area network (WAN). FIGS. 1 and 2 are intended as examples and not as architectural limitations for different embodiments of the present invention.

The following description is presented with respect to embodiments of the present invention, which can be embodied in the context of a data-processing system such as computer system 100, in conjunction with program module 125, various hardware modules such as an illumination module 305, a collection module 325, and a processing module 335 as described below and depicted in FIG. 3, and data-processing system 200 and network 202 depicted in FIGS. 1 and 2. The present invention, however, is not limited to any particular application or any particular environment. Instead, those skilled in the art will find that the system and methods of the present invention may be advantageously applied using a variety of system and application software. Moreover, the present invention may be embodied on a variety of different platforms including Macintosh, UNIX, LINUX, smartphones and the like. Therefore, the descriptions of the exemplary embodiments, which follow, are for purposes of illustration and not considered a limitation.

Figure 3:
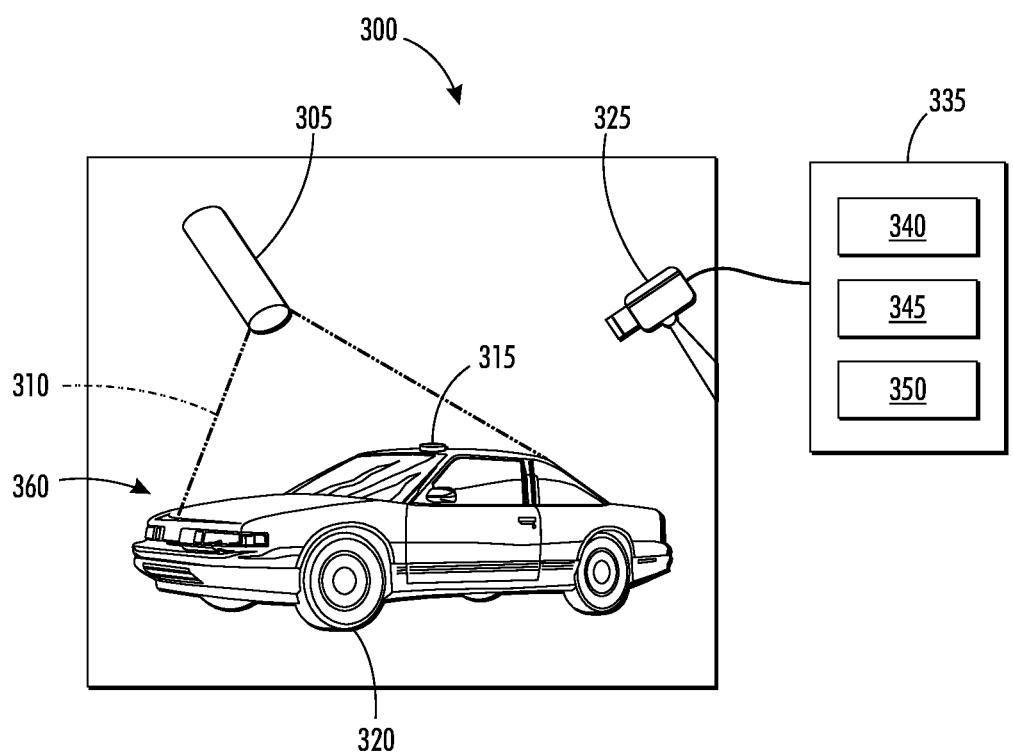
FIG. 3 depicts a graphical representation of a system for detecting if a stationary vehicle is idling in accordance with the disclosed embodiments.

FIG. 3 illustrates a graphical representation of system 300 for detecting and identifying engine vibration associated with a stationary vehicle 320. System 300 includes an illumination module 305. In a preferred embodiment, illumination module 305 can be a low cost, coherent, diffuse, low-power, infrared, near infrared, or visible light source. This may be a simple diffuse diode laser preferably of a wavelength near the infrared (IR) portion of the electromagnetic spectrum. In an alternative embodiment, the illumination module 305 may be a coherent light source of any wavelength.

In a preferred embodiment, illumination module 305 can comprise a diode laser with both transverse and longitudinal coherence. As discussed in more detail with respect to FIG. 4, the detection of vibrations from the running engine of a vehicle 320 is predicated on interference, which requires that the light propagated from light source 305 be coherent. Generally, diode lasers have both the transverse and longitudinal coherence required to create the necessary interference pattern. However, highly monochromatic light emitting diodes (LEDs) or other such devices may be developed in the future which provide the necessary coherence to be implemented in the present invention.

Illumination module 305 is configured to shine light beam 310 on the surface of a stationary vehicle 320. This creates a light speckle or light blob 315 on the exterior surface of the vehicle. In FIG. 3, light beam 310 is shown projecting on the roof of a stationary vehicle 320. However, light beam 310 can be equivalently shined on any external surface of a stationary vehicle 320 where the necessary interference associated with a speckle 315 can be detected by capture module 325. In an alternate embodiment, the light beam 310 could also be more diffuse and shine over an area where several vehicles are located. The image of the speckle 315 on each vehicle can be independently analyzed to determine if that specific vehicle's engine is running.

Capture module 325 is used to capture the reflection of a light beam 310 from the surface of a stationary vehicle 320. Capture module 325 could be a simple low resolution, low frame rate video camera. In one embodiment, the video camera may optimally operate at 20 to 25 frames per second. Alternatively, cameras of higher resolution and higher frame rates can be used. In another embodiment, capture module 325 may be any other image capturing device that is capable of detecting both spatial and temporal characteristics of a speckle 315. This may include a video camera, still image camera, photographic camera, tracking device, etc. To that end, if capture module 325 is embodied as a photographic or still camera, it may be necessary to take multiple pictures in quick succession in order to adequately capture changes in the speckle.

One advantage of the present invention is that it may be integrated with an existing security infrastructure. For example, in one embodiment of the invention capture module 325 can be an existing security detection equipment such as security cameras or the like, deployed in an environment 360 such as a parking facility, garage, or fueling station.

Likewise, various components of the present invention can be installed and integrated into an existing infrastructure. For example, illumination module 305 may be installed in an environment 360 such as a parking structure, parking lot, garage, or fueling station already equipped with video surveillance cameras 325. A single capture module 305 can be used to evaluate a plurality of vehicles as long as the module has an unobstructed view of the speckle 315. The same illumination module 305 can illuminate an area corresponding to one or several vehicles. Alternatively, one illumination module as represented by 305 can be used for each vehicle.

Lenses do not focus light perfectly. For example, a single point can typically only be imaged as a spot with an associated circle of confusion. A circle of confusion is the optical spot resulting from the cone of light rays propagating from a point source that do not form a perfect point, but rather a spot when imaged. In order to observe interference, the characteristic circle of confusion of the capture module 325 must be between 1 and 100 pixels in diameter, and preferably, between 5 and 20 pixels in diameter.

The lower bound for the circle of confusion of a digital sensor is two pixels since no object of smaller pixel dimensions can be resolved. Typical specifications for the magnitude of the circle of confusion in commercially available digital cameras are on the order of a few pixels. This implies that any surveillance camera can serve as an image capture device in capture module 325.

Capture module 325 provides the captured data to a processing module 335. Processing module 335 processes the captured interference pattern and determines if the vehicle's engine is on. This determination is based on the spatial and temporal characteristics of the speckle 315.

When a vehicle's engine is running it causes slight vibrations on the external surface of the vehicle. This vibration causes a time variation of the interference pattern on the sensor, or charge-coupled device (CCD), of capture module 325. Processing module 335 uses a real-time video processing algorithm to classify the texture of the interface pattern formed on the CCD of capture module 325. The texture of the interference pattern can then be evaluated to determine if it is indicative of an idling vehicle or a vehicle with an engine that is not running. This automated texture identification can also account for the time dependence of the interference pattern texture as seen by the camera. This makes the detection more robust and prevents false detections from other sources of vibration such as people inside the vehicle, pumping of fuel into the vehicle, or other such sources of vibration.

In one embodiment, processing module 335 can be comprised of several different sub-modules including a blob or speckle locator module 340, a texture descriptor calculator 345, and a texture discriminator module 350. It should be appreciated that processing module 335 and the various sub-modules may be implemented as a series of software modules 125 comprising non-transitory instruction media implemented by a computer system 100 and/or a networked system 200.

Processing module 335 includes a blob locator module 340. This module is used to segment the captured image into two regions, one containing the interference pattern resulting from the reflected light, and one corresponding to the unlit region. In a preferred embodiment, the capture module 325 can be equipped with an Infrared filter with its bandpass frequency tuned to the frequency of the light source. This makes the speckle 315 easily separable from the unlit portion of the scene by increasing the intensity gap between the speckle and its surroundings. The blob locator module 340 may preferably use a region growing algorithm with seeds located at the pixels with the highest respective values. The blob locator module 340 outputs may be a binary image or mask with values equal to 1 at locations where the light blob is located and values equal to 0 elsewhere. Pixels in the captured image whose location corresponds to the location of pixels with value equal to 1 in the binary mask will be processed further.

Processing module 335 also includes a texture descriptor module 345. This module preferably takes advantage of a local binary pattern operator which is a non-linear filter that assigns a texture label to every pixel in the region of interest (i.e., that area identified by the blob locator module 340). The texture appearance of the interference pattern may alternatively be determined using a scale-invariant feature transformation, a process of Gabor filtering, or a texton-based approach. Other texture descriptors or texture analysis procedures can be used to determine texture appearance metrics.

Using a local binary pattern operator, the texture label is calculated by first assigning each pixel a grayscale value, and then thresholding the pixels in the neighborhood of the target pixel. For example, in a preferred embodiment, the 3 pixel by 3 pixel group surrounding the target pixel can be used as the neighborhood. If the neighboring pixel gray scale value is greater than or equal to the target pixel it is assigned a 1, otherwise it is assigned a 0. The resulting 8 binary values can then be strung together to create an 8-bit binary number which is then converted into a 0-255 texture label. This is repeated for each pixel in the region of interest.

Application of the local binary pattern operator to an M×N pixel grayscale image results in an M×N array of 0-255 texture values. The dimensionality of the output can optionally be reduced to make it suitable for texture discrimination applications. A histogram of texture values of the output texture array may be calculated and used as a global texture descriptor.

Once the texture descriptor module has assigned texture values to each pixel, the texture discriminator module 350 may be implemented to ascertain if the region of interest is indicative of an idling car or a car that is shut off. In order to achieve discrimination, the appearance of the texture of a stationary target needs to be available as a reference. This can be achieved in one of many ways.

In a preferred embodiment, the texture discriminator module 350 is trained in advance. During the training stage, the texture discriminator module 350 can be provided images which are manually labeled as corresponding to a stationary vehicle with a running engine or a stationary vehicle with a stopped engine. A texture descriptor for each class (i.e., a running engine or a stopped engine) can be found by averaging the local binary pattern texture histograms provided by the texture descriptor module 345 for each of the training images. It should be noted that the texture descriptor module 345 may alternatively define the texture of the image using any number of known methods for defining an image texture.

In another embodiment, an operator manually labels pixels in the field of view of the camera that are known to always be stationary and that are impinged by the light source. According to this embodiment, the texture appearance of the speckle on the target vehicle is compared to that of the speckle on the manually-labeled stationary regions. In yet another embodiment, background estimation algorithms which determine the location of the stationary background may be used. The texture appearance of lit portions of the stationary background can then be used as a reference.

After the texture discriminator module 350 has been trained or a reference stationary texture appearance is available, a captured interference pattern with an unknown class taken from a vehicle surface such as, for example, data collected by the capture module 325 and processed by the blob locator module 340 and texture descriptor module 345 above, can be identified as associated with a running engine or a stopped engine utilizing a nearest-neighbor approach wherein the local binary pattern texture histogram of the unknown image can be compared to test histograms identified as indicative of a running engine or a stopped engine. The image is then classified as representative of a vehicle with a running engine or a vehicle with an engine not running, by identifying the training texture histogram that is most similar to its own histogram.

Alternatively, the comparison of the unknown interference pattern with the known interference patterns can be conducted by the using a nearest neighbor classifier, a support vector machine classifier, a Bayes classifier, or a neural network classifier using the texture discriminator module 350. Other clustering, classification, and machine learning techniques can potentially be used to make the comparison.

Figure 4:
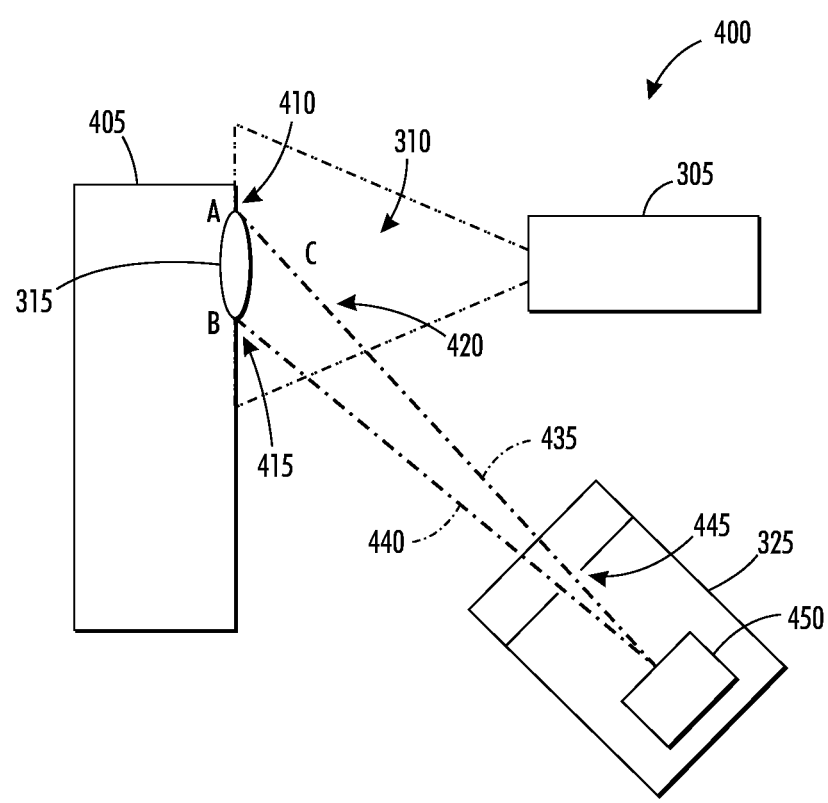
FIG. 4 depicts a block diagram of a system for detecting if a stationary vehicle is idling in accordance with the disclosed embodiments.

FIG. 4 illustrates a block diagram depicting a detailed arrangement of elements for detecting if a stationary vehicle is idling. In FIG. 4 for purposes of illustration, illumination module 305 is embodied as a diverging coherent laser pointer in accordance with a preferred embodiment. It should be recognized that illumination module 305 can be any number of light sources with the proper characteristics and this example should not be read to limit the acceptable embodiments of the present invention.

Light interference requires coherence. Larger coherence of the light projected, for example, on vehicle 320 will make the interference pattern more visible. Coherence is a measure of the modulation depth of an interference pattern. There are two types of coherence: spatial (also known as transverse) coherence, and temporal (also known as longitudinal) coherence. Transverse coherence is the coherence across different points of the same wavefront. Longitudinal coherence is important for interference between two beams originating from the same source and travelling different distances.

In FIG. 4, the transverse coherence length is the maximum distance between points A 410 and B 415 that still allows the beams reflected from points A 410 and B 415 to form an interference pattern on the sensor 450 of capture module 325. The longitudinal coherence length is the maximum distance between points A 410 and C 420 for interference to be observed.

As illustrated, the light beam 310 will propagate to the surface of a vehicle 405. As the light beam 310 travels to the surface of the vehicle 315, it will contact the vehicle's surface at a number of different points, for example, points A 410 and B 415. Light waves will then reflect from the surface of the vehicle to the sensor 450 along paths 435 and 440, respectively. The distances traversed by light along paths 435 and 440 are different. Thus, the light reflected from point A 410 and point B 415 respectively will interfere where they meet at sensor 450 within capture module 325. If the vehicle's engine is running, this will cause the surface of the vehicle to vibrate. This in turn will cause an independent and random perturbation of the length of paths 435 and 440 across time. When the difference in the lengths of paths 435 and 440 becomes larger than approximately 1 micrometer, there is a change in the interference pattern formed on the sensor 450.

In general, a camera lens is used to compensate for the lack of focus in the image that manifests itself as a consequence of light rays originating from a single point of the imaged object and passing though multiple positions in the plane of a pupil 445. If a camera has a perfectly ideal focus, the camera chamber works just like a camera with a pin-hole F-stop. If a pin-hole sized F-stop were implemented in the present invention (or equivalently, if the circle of confusion of the camera were equal to 1 pixel) beams originating from points A 410 and B 415 could not superpose on the sensor 450 because they would pass through a common point. Instead, the capture module 325 has an imaging circle of confusion with diameter greater than 1 pixel. This allows the formation of the interference of beams 435 and 440 from points A 410 and B 415 at sensor 450.

Figure 5:
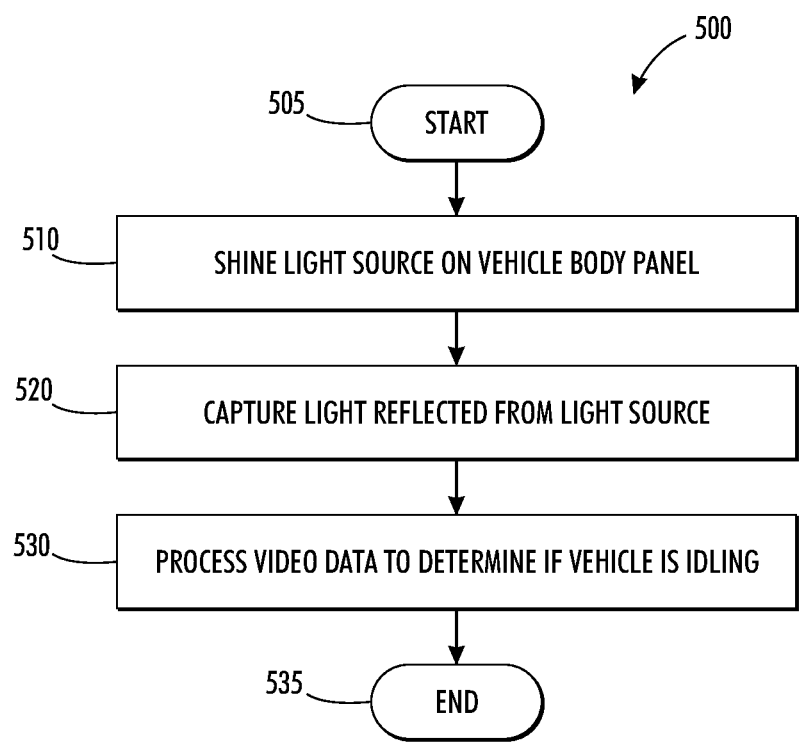
FIG. 5 depicts a high level flow chart illustrating logical operational steps of a method for detecting if a stationary vehicle is idling in accordance with the disclosed embodiments.

Flow chart 500 in FIG. 5 depicts logical operational steps associated with detecting if a stationary vehicle's engine is running in accordance with the disclosed embodiments. This method allows for the automatic detection of an idling vehicle. The method begins as indicated at block 505.

Block 510 indicates that a light source can be shined on an exterior surface of a vehicle body panel. As discussed below in more detail, a running vehicle will cause a distinct interference pattern. The spatial and temporal characteristics of this interference pattern will differ based on the vibrations of the exterior surface of the vehicle body panel caused by a running engine.

Next, at block 520 the light reflected from the exterior surface of the vehicle body panel is captured. In a preferred embodiment, the interference pattern can be captured by a video camera, but any apparatus capable of detecting the interference pattern associated with reflected light may be alternatively employed.

In a preferred embodiment, the camera may further be a low cost, low resolution, Red Green Blue (RGB), near infrared (NIR), or black and white (B&W) 20-25 frame per second video camera. The camera can be chosen to have a circle of confusion greater than 1 pixel.

The method continues at block 530 where a video processing module is used to process the captured video data. A determination of whether the vehicle is idling can be based on the spatial and temporal characteristics of the captured light. After the processing module determines if the vehicle is idling, the method ends as illustrated at block 535.

Figure 6:
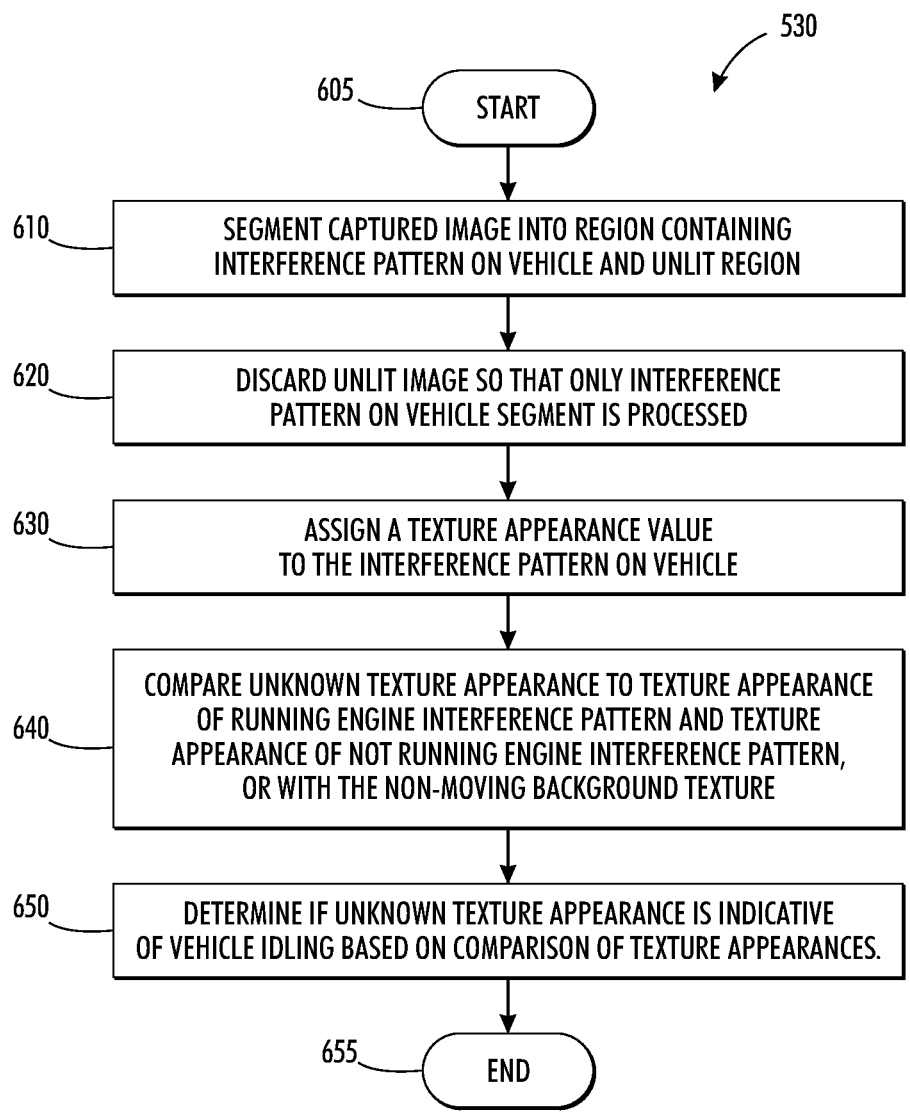
FIG. 6 depicts a detailed flow chart of method steps for processing video data to determine if a stationary vehicle is idling in accordance with the disclosed embodiments.

FIG. 6 illustrates a flow chart illustrating detailed steps associated with step 530 above wherein video data is processed to determine if a vehicle is idling.

The method begins at block 605. At block 610, the captured data is segmented into a region containing an interference pattern on the vehicle and an unlit region. This step may be accomplished using a blob locator module 340, as illustrated in FIG. 3. Next as illustrated by block 620, the background image is discarded so that only the interference pattern segment is further subject to processing.

Block 630 shows that a texture appearance value can be assigned to the interference pattern. In a preferred embodiment, this step can be accomplished using a texture descriptor module 345, as shown in FIG. 3. The texture appearance of the interference pattern may be determined using a local binary pattern operator, scale-invariant feature transformation, a process of Gabor filtering, or a texton-based approach. Other texture descriptors or texture analysis procedures can be used to determine texture appearance metrics.

Next, the method continues to block 640, where the unknown texture appearances are compared to known texture appearances from both running engine interference patterns and non-running engine interference patterns. This step can be accomplished using the texture discriminator module 350 shown in FIG. 3. It should be noted that the texture can further be compared against the texture of the speckle reflecting from non-moving background if necessary.

Finally, at block 650 the comparison at block 640 is used to determine if the unknown texture appearance is indicative of the vehicle running or the vehicle not running. The method then ends at block 655.

Based on the foregoing, it can be appreciated that a number of embodiments, preferred and alternative, are disclosed herein. For example, a method for idling vehicle detection comprises shining a light source on an exterior surface of a vehicle with an illumination module; collecting light reflected from the exterior surface of the vehicle with a capture module; and processing the collected light reflected from the exterior surface of the vehicle surface with a processing module wherein the processing model determines if the vehicle's engine is running or if the vehicle's engine is not running.

The method can include at least one of a camera and a video camera configured with a circle of confusion greater than 1 pixel thereby allowing light reflected from the exterior surface of the vehicle to form an interference pattern on the sensor of at least one of the camera and the video camera.

In another embodiment, processing the collected light reflected from the exterior surface of the vehicle further comprises analyzing the texture appearance of the interference pattern by at least one of: a local binary pattern analysis, a scale-invariant feature transformation, a process of Gabor filtering, and a texton-based approach.

The method can further include configuring the processing module for identifying a speckle associated with the interference pattern. A relative texture label is then assigned to each pixel associated with the identified speckle and a texture histogram of relative texture labels from the identified speckle is compared to at least one texture histogram from a speckle associated with a running engine, and at least one texture histogram from a speckle associated with a non-running engine to determine if the texture histogram resulted from a vehicle with an engine running or from a vehicle with an engine not running. This comparison can be made using at least one of a nearest neighbor classifier, a support vector machine classifier, a Bayes classifier, and a neural network classifier.

The light source described above comprises a coherent, low-power light source, which can be a visible light source, a near infrared light source, and an infrared light source. The method can further comprise monitoring a plurality of vehicles distributed in an environment to determine if any of the vehicles is idling.

In another embodiment, the system for detecting idling vehicles comprises an illumination module configured to shine a light source on an exterior surface of a vehicle, a capture module configured to collect light reflected from the exterior surface of the vehicle, the light being propagated by the illumination module, and a processing module for processing the collected light reflected from the exterior surface of the vehicle, wherein the processing model determines if the vehicle's engine is running or if the vehicle's engine is not running.

The capture module comprises at least one of a camera and a video camera configured to possess a circle of confusion greater than 1 pixel, thereby allowing light reflected from the exterior surface of the vehicle to form an interference pattern on the sensor of at least one still camera and/or video camera.

The system includes a processing module, which processes the collected light reflected from the exterior surface of the vehicle by analyzing the texture appearance of the interference pattern. This analysis can be performed using one of a local binary pattern analysis, a scale-invariant feature transformation, a process of Gabor filtering, and a texton-based approach. Alternatively, other texture descriptors or texture analysis procedures can be used to determine texture appearance metrics.

In another embodiment, the system includes a processing module configured for identifying a speckle associated with the interference pattern, assigning a relative texture label to the pixels associated with the identified speckle, and comparing a texture appearance metric comprising the relative texture labels from the identified speckle to at least one texture appearance metric from a speckle associated with a running engine and at least one texture appearance metric from a speckle associated with a non-running engine to determine if the texture appearance metric resulted from a vehicle with an engine running or from a vehicle with an engine not running. The processing module compares the texture appearance metrics according to one of a nearest neighbor classifier, a support vector machine classifier, a Bayes classifier, and a neural network classifier. Alternatively, other clustering, classification, and machine learning techniques can potentially be used to make the comparison.

The system includes a coherent low-power light source. This light source is at least one of a visible light source, a near infrared light source, and an infrared light source. The system is deployed in an environment to monitor a plurality of vehicles and determine if any of the vehicles are idling.

In another embodiment, a method for idling vehicle detection comprises shining a light source on an exterior surface of a vehicle, wherein the light source comprises a coherent, low-power light source. The light is collected from the exterior surface of the vehicle with a capture module, wherein the capture module is configured to possess a circle of confusion greater than 1 pixel thereby allowing light reflected from the exterior surface of the vehicle to form an interference pattern on a sensor of the capture module. The collected light is then processed with a processing module wherein processing the collected light reflected from the exterior surface of the vehicle further comprises analyzing the texture appearance of the interference pattern to determine if the vehicle's engine is running or if the vehicle's engine is not running. The coherent low-power light source is at least one of a visible light source, a near infrared light source, and an infrared light source.

The texture appearance of the interference pattern is determined by one of a local binary pattern analysis, a scale-invariant feature transformation, a process of Gabor filtering, and a texton-based approach. Alternatively, other texture descriptors or texture analysis procedures can be used to determine texture appearance metrics.

The method further comprises monitoring a plurality of vehicles distributed in an environment to determine if any of the plurality of vehicles is idling.

While the embodiments have been particularly shown and described herein, it will be understood by those skilled in the art that various changes in form and detail may be made therein without departing from the spirit and scope of such embodiments. It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for idling vehicle detection, said method comprising:
    shining a low-power, diffuse light source that is transversely coherent and longitudinally coherent, on a surface of a vehicle with an illumination module;
    collecting data associated with light reflected from said surface of said vehicle with a capture module; and
    processing said collected data associated with said light reflected from said surface of said vehicle surface with a processing module wherein said processing module is configured for:
    segmenting said data into a region containing an interference pattern and an unlit region;
    identifying a speckle in said region containing an interference pattern associated with said collected light reflected from said surface;
    assigning a texture value to each of a plurality of pixels in said speckle;
    creating a histogram of said texture values of each of said plurality of pixels;
    creating a global texture descriptor associated with said speckle from said histogram; and
    comparing said global texture descriptor of said speckle to a reference set of texture descriptors comprising texture descriptors of speckles associated with a vehicle's engine running and texture descriptors associated with a vehicle's engine not running in order to determine if a temporal characteristic and a spatial characteristic of said speckle is indicative of said vehicle's engine running or said vehicle's engine not running.

2. The method of claim 1 wherein said capture module comprises at least one of a still camera and a video camera configured to possess a circle of confusion between 2 and 5 pixels thereby allowing light reflected from said surface, of said vehicle to form said speckle pattern comprising an interference pattern on a sensor of at least one of said still camera and said video camera.

3. The method of claim 2 further comprising:
    manually training a texture discriminator module to identify speckles associated with a vehicle with a running engine and speckles associated with a vehicle without a running engine.

4. The method of claim 3 wherein said texture appearance of said interference pattern is determined by one of:
    a local binary pattern analysis:
    a scale-invariant feature transformation; and
    a process of Gabor filtering.

5. The method of claim 4, wherein
    assigning a texture value to each pixel associated with said speckle further comprises:
    assigning each of said pixels a greyscale value;
    thresholding pixels in a neighborhood of each of said pixels; and
    creating an 8-bit binary number which is converted to said texture value.

6. The method of claim 5, wherein said cc comparison is conducted using one of:
    a nearest neighbor classifier;
    a support vector machine classifier;
    a Bayes classifier; and
    a neural network classifier.

7. The method of claim 5, wherein said method further comprises:
    shining said light source on a plurality of vehicles distributed in an environment;
    manually labeling pixels in a field of view of said capture module known to be stationary;
    adopting said labeled pixels as said reference set of texture descriptors; and
    monitoring said plurality of vehicles distributed in said environment with said single light source to determine if any of said plurality of vehicles are idling.

8. The method of claim 1 wherein said light source comprises a coherent, low-power light source and wherein said coherent low-power light source is a near infrared light source.

9. A system for detecting idling vehicles comprising:
    an illumination module configured to shine a low-power, diffuse light source that is transversely coherent and longitudinally coherent, on a surface of a vehicle;
    a capture module configured to collect data associated with light reflected from said surface of said vehicle, said light being propagated by said illumination module; and
    a processing module for processing said collected data associated with said light reflected from said surface of said vehicle, wherein said processing model is configured for:
    segmenting said data into a region containing an interference pattern and an unlit region;
    identifying a speckle in said region containing an interference patter associated with said collected light reflected from said surface;
    assigning a texture value to each of a plurality of pixels in said speckle;
    creating a histogram of said texture values for each of said plurality of pixels;
    creating a global texture descriptor associated with said speckle from said histogram; and
    comparing said global texture descriptor of said speckle to a reference set of texture descriptors comprising texture descriptors of speckles associated with a vehicle's engine running and texture descriptors associated with a vehicle's engine not running in order to determine if a temporal characteristic and a spatial characteristic of said speckle is indicative of aid vehicle's engine running or if said vehicle's engine not running.

10. The system of claim 9 wherein said capture module comprises at least one of a still camera and a video camera configured to possess a circle of confusion of between 2 and 5 pixels, thereby allowing light reflected from said surface of said vehicle to form said speckle pattern comprising an interference pattern on a sensor of at least one of said still camera and said video camera.

11. The system of claim 10 wherein said processing module is further configured for:
    manually training a texture discriminator module to identify speckles associated with a vehicle with a running engine and speckles associated with a vehicle without a running engine.

12. The system of claim 11 wherein said processing module determines a texture appearance of said interference pattern by one of:
    a local binary pattern analysis;
    a scale-invariant feature transformation; and
    a process of Gabor filtering.

13. The system of claim 12 wherein assigning a texture value to each pixel associated with said speckle further comprises:
- assigning each of said pixels a greyscale value;
- thresholding pixels in a neighborhood of each of said pixels; and
- creating an 8-bit binary number which is converted to said texture value.

14. The system of claim 13, wherein said processing module compares said texture appearance metrics according to one of;
- a nearest neighbor classifier:
- a support vector machine classifier;
- a Bayes classifier; and
- a neural network classifier.

15. The system of claim 14 wherein said light source comprises a coherent, low-power light source, and wherein said coherent low-power light source is a near infrared light source.

16. The system of claim 15, wherein said system is deployed in an environment and wherein said light source is shone on a plurality of vehicles distributed in said environment and said system:
- labels pixels in a field of view of said environment known to be stationary;
- adopts said labeled pixels as said reference set of texture descriptors; and
- monitors said plurality of vehicles distributed in said environment with said single light source to determine if any of said plurality of vehicles is idling.

17. A method for idling vehicle detection, said method comprising:
- shining a low-power, diffuse light source that is transversely coherent and longitudinally coherent, on a surface of a vehicle, wherein said light source comprises a coherent, low-power light source;
- collecting data associated with light reflected from said surface of said vehicle with a capture module, wherein said capture module is configured to possess a circle of confusion of between 2 and 5 pixels thereby allowing said image to form an interference pattern on a sensor of said capture module; and
- processing said collected data associated with said light reflected from said vehicle surface with a processing module wherein processing module is configured for:
- segmenting said data into a region containing an interference pattern and an unlit region;
- identifying a speckle in said region containing an interference pattern associated with said collected light reflected from said surface;
- assigning a texture value to each of a plurality of pixels in said speckle;
- creating a histogram of said texture values for each of said plurality of pixels;
- creating a global texture descriptor associated with said speckle from said histogram; and
- comparing said global texture descriptor of said speckle to a reference set of texture descriptors comprising texture descriptors of speckles associated with a vehicle's engine running and texture descriptors associated with a vehicle's engine not running to determine if a temporal characteristic and a spatial characteristic of said speckle is indicative of said vehicle's engine running or if said vehicle's engine not running.

18. The method of claim 17 wherein said coherent low-power light source is at least one of:
- a near infrared light source; and
- an infrared light source.

19. The method of claim 18 wherein said texture appearance of said interference pattern is determined by one of:
- a local binary pattern analysis;
- a scale-invariant feature transformation; and
- a process of Gabor filtering.

20. The method of claim 19, further comprising:
- shining said light source on a plurality of vehicles distributed in an environment;
- manually labeling pixels in a field of view of said capture module known to be stationary;
- adopting said labeled pixels as said reference set of texture descriptors; and
- monitoring said plurality of vehicles distributed in said environment with said single light source to determine if any of said plurality of vehicles are idling.

* * * * *